Feb. 25, 1964

R. G. MINER ETAL 3,122,002

ABSORPTION REFRIGERATING SYSTEM

Filed Feb. 9, 1961

INVENTORS
R. G. MINER
E. M. STUBBLEFIELD
BY
*Holmes & Andersen*
ATTORNEYS

United States Patent Office 3,122,002
Patented Feb. 25, 1964

3,122,002
ABSORPTION REFRIGERATING SYSTEM
Robert G. Miner and Edward M. Stubblefield, La Crosse, Wis., assignors to The Trane Company, La Crosse, Wis., a corporation of Wisconsin
Filed Feb. 9, 1961, Ser. No. 88,212
5 Claims. (Cl. 62—141)

This invention relates to absorption refrigerating systems and more particularly to controls for such systems.

It is an object of this invention to provide means for starting the various parts in sequence responsive to manually closing an electrical circuit to one of the pumps.

It is another object of the invention to provide means for discontinuing operation in such a manner that concentration of solution and solidification is avoided.

It is another object of the invention to delay de-energization of the pump which supplies lubrication until the pumps so supplied have been de-energized.

It is another object of the invention to conduct dilute solution from the absorber to the absorber solution recirculating conduits on shut down of the system to flush out the concentrated solution from these conduits in order to avoid solidification of concentrated solution in these conduits.

It is another object of the invention to reduce the steam consumption by providing controls which operate at reduced loads to reduce the rate of flow of dilute solution from the absorber through the heat exchanger to the generator.

Other objects and advantages will become apparent as the specification proceeds to describe the invention with reference to the accompanying drawings in which.

Figure 1:
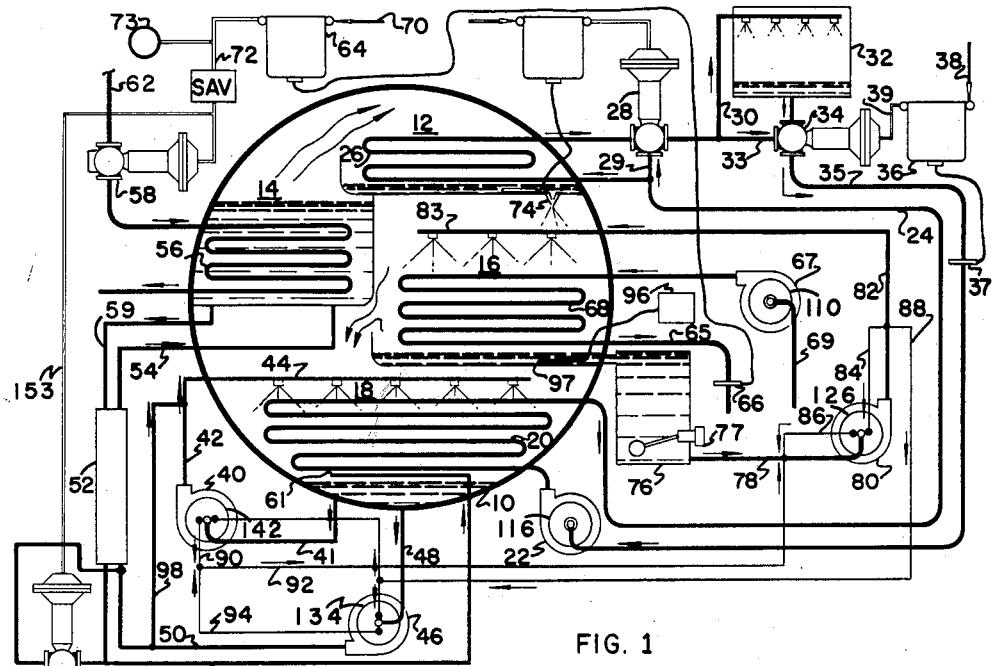
FIGURE 1 is a diagrammatic view of the absorption system including the controls.

Referring now to FIGURE 1, the absorption system shown has a single shell 10 enclosing a condenser 12, a generator 14, an evaporator 16, and an absorber 18. It should be understood that other arrangements might be used; for instance, the generator and condenser could be in one shell and the absorber and evaporator could be in a second shell with conduits therebetween for conducting fluids.

The absorber 18 has a coil 20 supplied with cooling fluid by a pump 22. This cooling fluid is conducted from the coil 20 through a conduit 24 to a cooling coil 26 in the condenser 12. From the cooling coil 26, the cooling fluid passes through a pneumatic valve 28 and thence through a conduit 30 to a cooling tower 32. A portion of the fluid flowing in pipe 24 may by-pass the coil 26 through the conduit 29 according to the position of the pneumatic valve 28 and a portion of the fluid flowing from the valve 28 may flow through conduit 33 through pneumatically operated valve 34 thus by-passing the cooling tower 32. A conduit 35 conducts fluid from the valve 34 to the pump 22. A pneumatic temperature controller 36 has a temperature sensitive bulb 37 in temperature sensing relationship with the fluid in conduit 35 and is connected to a source of air pressure 38. Temperature controller 36 transmits its control pressure to valve 34 through conduit 39. Refrigerant vapor from the generator 14 is condensed in condenser 12 by removal of heat through cooling coil 26.

Various types of refrigerant and adsorbent may be used in the present machine. A solution of lithium bromide as an absorbent and water as a refrigerant is satisfactory. Other salt solutions may be used if desired.

The term "concentrated solution" as used herein means a solution which is concentrated in absorbent.

A solution circulating pump 40 receives solution from the absorber 18 through conduit 41, and discharges the solution into a conduit 42 which is connected to a spray tree 44 which sprays the solution into the absorber 18 over the tubes 20.

A pump 46 draws solution from the absorber 18 through a conduit 48 and dischargese the solution through a conduit 50 which conducts the fluid to one pass of a heat exchanger 52 from which the fluid flows through a conduit 54 to the generator 14.

The solution in the generator is heated by a coil 56 which is preferably supplied with steam as a heating fluid through valve 58. Boiling of the solution in the generator causes refrigerant vapors to pass into the condenser 12. The concentrated solution flows from the generator 14 through conduit 59 to one pass of heat exchanger 52 and thence through conduit 60 and 61 to the absorber 18. The outlet of conduit 61 is adjacent the entrance to conduit 41 and remote from the entrance to conduit 48 so that the solution flowing in conduit 41 is more concentrated than the solution flowing in conduit 48. The conduits 41 and 48 may be spaced longitudinally of the shell for the same reason if desired. In the heat exchanger 52, the dilute solution passing from the absorber 18 to the generator 14 is heated by the concentrated solution flowing fom the generator 14 to the absorber 18. The steam valve 58 is connected to a source of steam 62. A pneumatic temperature controller 64 has a temperature sensitive bulb 66 in temperature sensing relationship with the fluid leaving the evaporator coil 68 through conduit 65. The temperature of fluid produced in conduit 65 is responsive to and is substantially the temperature of the evaporator 16. The fluid circulated through the coil 68 may be water, brine, or other fluid, but for purposes of explanation it will be assumed to be water, and it will be called chilled water. A chilled water pump 67 is connected to receive chilled water from a refrigeration load through a conduit 69. After flowing through coil 68, the chilled water is returned to the refrigeration load through conduit 65. The temperature controller 64 is connected to a source of pneumatic pressure 70 and transmits control pressure to valve 58. A pressure switch 73 is interposed in the conduit 72 between the pressure controller 64 and the solenoid valve SAV. The operation of the solenoid valve SAV and the pressure switch 73 will be more fully described later.

The refrigerant condensed in the condenser 12 flows downwardly through an opening 74 into the evaporator 16. The evaporator has a float chamber 76 containing a float switch 77 which opens when the level drops below a predetermined point. A conduit 78 conducts refrigerant from the float chamber 76 to a refrigerant pump 80. The refrigerant flows from the pump 80 through a conduit 82 to a spray tree 83 in the evaporator 16. Refrigerant vapor flows from the evaporator 16 to the absorber 18 thus causing evaporation and cooling of the refrigerant liquid in the evaporator 16.

Refrigerant from the conduit 82 is conducted through conduit 84 to the pump 80 to cool and lubricate the working parts thereof, and the refrigerant thus conducted to the pump is returned to conduit 78 through conduit 86.

Refrigerant from conduit 82 also flows through conduit 88 to pumps 40 and 46 to cool and lubricate the working parts thereof. From pump 40, the refrigerant flows through conduits 90, 92, and 78. From pump 46, the refrigerant flows through conduits 94, 92, and 78.

A low temperature cut-out switch 96 has a temperature sensitive bulb 97 in the refrigerant in the evaporator 16. Switch 96 initiates a shut down of the machine when the evaporator temperature drops below a predetermined point.

A conduit 98 conducts fluid from conduit 50 to conduit 42. As will be explained more fully in connection with the controls, the absorber recirculating pump 40 and the condenser water pump 22 are the first pumps to be de-energized when the machine is shut down. Inasmuch as the solution pump 46 continues to operate for a timed period, a portion of the solution delivered by it will flow through conduit 98. This solution will flow by gravity downward through pipe 42, then through pump 40 into conduit 41 and finally into the bottom of the absorber 18. The more concentrated solution in these conduits and in pump 40 is thus flushed out by the more dilute solution from pump 46 and the danger of solidification in these passageways when the system cools down is avoided. The solution in the spray tree 44 drains by gravity when the pump 40 is de-energized. When the machine is in normal operation, the pressure developed by pump 40 opposes flow through conduit 98 so that there is substantially no flow in this conduit 98.

Figure 2:
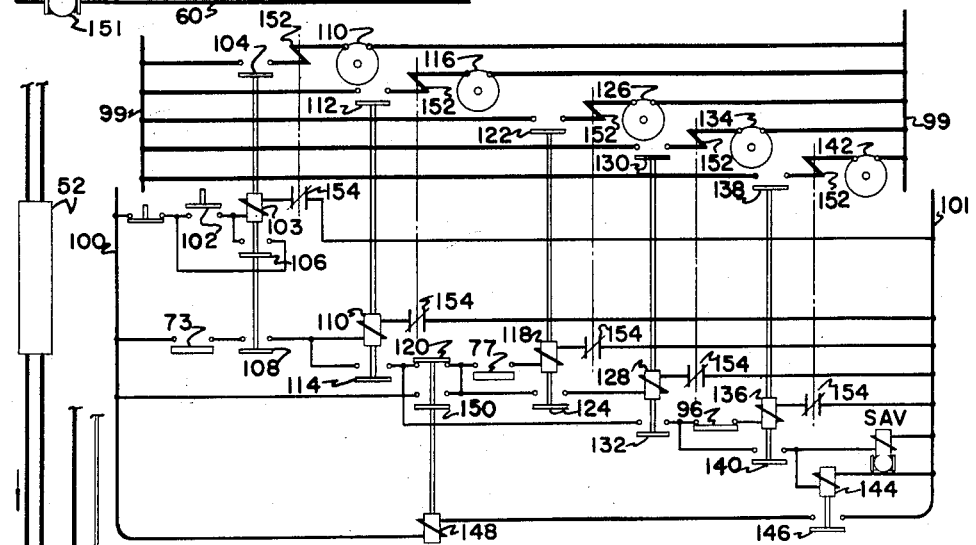
FIGURE 2 is a diagram showing the electrical circuit.

The control system will now be described with reference to FIGURE 2. Electric power is supplied for the motors of the pumps by power lines 99. Electric power is supplied to other controls by power lines 100 and 101. To put the system into operation, the starting button switch 102 is closed thus energizing coil 103 which closes contacts 104, 106, and 108. Closing of contact 104 energizes the chilled water pump motor 110. Closing of holding contact 106 maintains energization of the line. Closing of contact 108 permits energization of coil 110 upon closing of pressure switch 73. Pressure switch 73 will be closed when the controller 64 indicates the need for cooling the chilled water. With contacts 73 and 108 closed, coil 110 is energized and contacts 112 and 114 are closed. Closing of contact 112 energizes the condenser water pump motor 116. Closing of contact 114 energizes coil 118 provided there is a level of water in sump 76 sufficient to close float switch 77. Contact 120 is normally closed. Energization of coil 118 closes contacts 122 and 124. Closing of contact 122 energizes motor 126 of refrigerant pump 80. Closing of contact 124 energizes coil 128 which closes contacts 130 and 132. Closing of contact 130 energizes motor 134 of solution pump 46. Closing of contact 132 energizes coil 136 provided that the temperature of the chilled water is not so low that temperature cut-out switch 96 is open. Coil 136, being energized, closes contacts 138 and 140. Closing of contact 138 energizes the motor 142 of absorption recirculating pump 40. Closing of contact 140 energizes solenoid air valve SAV to permit pneumatic pressure to be transmitted from temperature controller 64 to valve 58 to open valve 58 and allow steam to enter the coil 56 of the generator 14.

Closing of contact 140 also energizes coil 144 to close contact 146. Coil 144 and contact 146 form a time delay relay which is instantaneous closing and time delayed opening.

Closing of contact 146 energizes coil 148 which closes contact 150 and opens contact 120. The contacts 120 and 150 are so constructed that they are overlapping in that contact 120 opens after contact 150 has been made. Closing of contact 150 and opening of contact 120 transfers the source of power for the coil 118 of the refrigerant pump motor contact 122 and the coil 128 of the solution pump motor contactor 130 from the portion of the circuit supplied by the pressure switch 73 directly to one side of the source of control voltage.

A normally open pneumatic valve 151 is connected between conduit 50 and conduit 60 to control the flow of solution from conduit 50 to conduit 60. Valve 151 is connected to and receives its control pressure through a conduit 153 which is in fluid communication with conduit 72 at a point between the solenoid air valve SAV and the steam valve 58.

Figure 3:
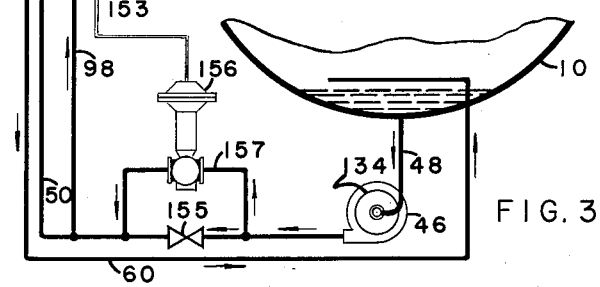
FIGURE 3 is a partial diagrammatic view showing a modification of the invention of FIGURE 1.

Reference is now made to FIGURE 3 which shows a modification of the invention in which a restrictor 155 is mounted in the conduit 50. A normally closed pneumatic valve 156 is mounted in a conduit 157 which is connected to by-pass the restrictor 155 in conduit 50. The flow of solution through conduit 50 to the heat exchanger 52 is therefore the sum of the flows through the restrictor 155 and the valve 156. Pneumatic valve 156 is connected to and receives its control pressure through conduit 153.

As the load on the system varies, the steam valve 58 will be modulated by the controller 64 to maintain an equilibrium at which the steam supplied to the generator is just sufficient to provide refrigeration equal to the system load.

With operation at reduced load, refrigerant is absorbed in the absorber 18 at a reduced rate and the generator 14 is only required to evaporate refrigerant at a reduced rate. Under these conditions, economy in the use of steam is effected by reducing the rate of solution flow to the generator 14, because an appreciable amount of heat input is consumed in raising the temperature of the solution leaving the exchanger 52 to the boiling temperature in the generator 14.

To accomplish this reduction in the rate of solution flow the valve 151 is caused to modulate toward its open position as the reduction of load occurs as measured by the controller 64. In this manner, the rate of circulation of solution between the absorber 18 and the generator 14 does not substantially exceed the amount required to produce refrigeration equal to the load on the system.

The operation may also be described in the following manner. When the load on the system decreases below a predetermined percentage of full load, the normally open valve 151 starts to open and dilute solution flows from conduit 50 to conduit 60 because the pressure is higher in conduit 50 than in conduit 60. Therefore the rate of solution flow to the generator 14 is reduced. With less solution to be heated to boiling temperature in the generator more of the heat from the steam is available for refrigeration and the evaporator tends to produce a lower temperature. However, the controls reduce the steam input to maintain the desired evaporator temperature.

It should also be pointed out that the absorber will operate more efficiently because the rate of flow of warm solution from the generator has been reduced. For a typical system, the valve 151 may start to open at 75 percent of full load and it may be fully open at 50 percent of full load.

Reference is now made to the system of FIGURE 3. When the load on the system decreases below a predetermined percentage of full load, the normally closed pneumatic valve 156 starts to close thus reducing the flow of solution to the generator 14. The steam required by the generator is reduced for the reasons explained above with reference to the system of FIGURE 1. In a typical system the valve 156 may start to close at 75 percent of full load and may be fully closed at 50 percent of full load.

When the chilled water temperature drops below a predetermined figure pressure switch 73 will open to interrupt the circuit to the coils 110 to de-energize the condenser water pump and to interrupt the circuit to coil 136, the solenoid air valve SAV and the time delay coil 144. The absorber recirculating pump motor 142 is thus de-energized; the solenoid air valve SAV closes the steam valve 58 by closing off its air supply. Contact 146 will remain closed for approximately 10 minutes. During this period the contact 150 remains closed and energizes coils 118 and 128 to continue to energize the motor 126 of the refrigerant pump and the motor 134 of the solution pump.

During the time delay period a small amount of solution from conduit 48 flows through the conduit 98 to the conduit 42, thus diluting the more concentrated solution in conduit 42, pump 40, and conduit 41 as explained above. The continued operation of the pump 46 during the time delay period also transmits solution from the absorber 18 to the generator 14 and solution flows from the generator 14 to the absorber 18 thus reducing the concentration of absorbent in the solution in the generator 14, the conduit 59, the heat exchanger 52 and the conduit 60.

Should the temperature of the evaporator through abnormal operation become dangerously low, the low temperature cut-out 96 will open the circuit to the coil 136 which de-energizes the absorber recirculating pump motor 142 by opening the contact 138. At the same time, contact 140 will open to de-energize solenoid air valve and coil 144 of the time delay relay. As explained previously, the coil 148 will remain energized through the delaying action of coil 144 and contact 146. Therefore, the contact 150 will remain closed for the time delay period to continue operation of the refrigerant pump motor 126 and the solution pump motor 134 as explained above. When solenoid 148 becomes de-energized, contact 120 will close and contact 150 will open and inasmuch as these contacts are overlapping, coil 118 and coil 128 will continue to be energized and pump motors 126 and 134 will continue to be energized.

Loss of refrigerant in the evaporator for any reason will result in insufficient level in the float chamber 76 to maintain the float switch 77 closed. The opening of float switch 77 will de-energize pump motors 126, 134, and 142 and solenoid valve SAV thus interrupting the transmission of pneumatic pressure to valve 58 and causing valve 58 to close.

Each of the circuits to the motors 110, 116, 126, 134, and 142 has an overload coil 152 which will open a normally closed contact 154 in the circuit to the coil which controls the contacts for energizing the particular motor.

Although we have described specific embodiments of our invention, it is contemplated that various changes may be made without departing from the spirit of our invention, and we desire to be limited only by the claims.

We claim:

1. In an absorption refrigerating system, the combination of an absorber, an evaporator, a generator and a condenser, a pump for circulating solution from the absorber to the generator, conduit for conducting solution from the generator to the absorber, a conduit for conducting heating medium to the generator, a first valve for regulating the flow of heating medium in said conduit, a second valve for regulating the rate of circulation of solution by said pump, and means for controlling said first valve and said second valve in response to a temperature produced by said evaporator.

2. In an absorption refrigeration system, the combination of an absorber, an evaporator, a generator and a condenser, a pump for circulating solution from the absorber to the generator, conduit for conducting solution from the generator to the absorber, means for controlling the capacity of the system, said last mentioned means comprising a first control member in a solution line to regulate the rate of flow of solution circulating through said pump, means for controlling the operation of said first control member in response to a temperature produced by said evaporator, a second control member for controlling the rate of flow of heating medium to the generator, and means responsive to a temperature produced by the evaporator for controlling the operation of said second control member.

3. In an absorption refrigerating system, the combination of an absorber, an evaporator, a generator and a condenser, a heat exchanger, a first conduit for conducting dilute solution from the absorber to a first pass of the heat exchanger, a second conduit for conducting solution from the first pass of the heat exchanger to the generator, a third conduit for conducting concentrated solution from the generator to a second pass of the heat exchanger, a fourth conduit for conducting solution from the second pass of the heat exchanger to the absorber, a pump in said first conduit for pumping solution in said first conduit from said absorber to the first pass of the heat exchanger and means for conducting solution from said first conduit at a point between the pump and the heat exchanger back to said absorber without passing through the heat exchanger, and means in said last mentioned means for regulating the flow therein responsive to a temperature produced by the evaporator.

4. In an absorption refrigerating system, the combination of an absorber, an evaporator, a generator and a condenser, a heat exchanger, a first conduit for conducting dilute solution from the absorber to a first pass of the heat exchanger, a second conduit for conducting solution from the first pass of the heat exchanger to the generator, a third conduit for conducting concentrated solution from the generator to a second pass of the heat exchanger, a fourth conduit for conducting solution from the second pass of the heat exchanger to the absorber, a pump in said first conduit for pumping solution in said first conduit from the absorber to the generator, valve means in said first conduit for controlling the flow in said first conduit, and means for controlling said valve in response to a temperature produced in said evaporator.

5. In an absorption refrigerating system, the combination of an absorber, an evaporator, a generator and a condenser, a heat exchanger, a first conduit for conducting dilute solution from the absorber to a first pass of the heat exchanger, a second conduit for conducting solution from the first pass of the heat exchanger to the generator, a third conduit for conducting concentrated solution from the generator to a second pass of the heat exchanger, a fourth conduit for conducting solution from the second pass of the heat exchanger to the absorber, a pump in said first conduit for pumping solution in said first conduit from said absorber to the generator, flow restricting means and valve means connected in parallel flow relationship in said first conduit, and means for controlling said valve means in response to a temperature produced in said evaporator.

References Cited in the file of this patent
UNITED STATES PATENTS

| | | |
|---|---|---|
| 2,502,104 | Reid | Mar. 28, 1950 |
| 3,002,359 | Miner | Oct. 3, 1961 |
| 3,005,318 | Miner | Oct. 24, 1961 |